(12) United States Patent
Odera et al.

(10) Patent No.: US 11,473,988 B2
(45) Date of Patent: Oct. 18, 2022

(54) TORQUE MEASURING DEVICE

(71) Applicant: NSK Ltd., Tokyo (JP)

(72) Inventors: Takahiro Odera, Shizuoka (JP); Junji Ono, Kanagawa (JP); Masahiro Kobayashi, Shizuoka (JP); Kota Fukuda, Shizuoka (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/637,263

(22) PCT Filed: Jul. 1, 2021

(86) PCT No.: PCT/JP2021/025004
§ 371 (c)(1),
(2) Date: Feb. 22, 2022

(87) PCT Pub. No.: WO2022/059296
PCT Pub. Date: Mar. 24, 2022

(65) Prior Publication Data
US 2022/0268649 A1  Aug. 25, 2022

(30) Foreign Application Priority Data
Sep. 16, 2020  (JP) .............................. JP2020-155208

(51) Int. Cl.
*G01L 3/00* (2006.01)
*G01L 3/10* (2006.01)
*G01L 1/12* (2006.01)

(52) U.S. Cl.
CPC .............. *G01L 3/102* (2013.01); *G01L 1/125* (2013.01); *G01L 1/127* (2013.01)

(58) Field of Classification Search
CPC .......... G01L 3/102; G01L 1/125; G01L 1/127
See application file for complete search history.

(56) References Cited

U.S. PATENT DOCUMENTS

| 4,823,620 A | * | 4/1989 | Edo | .......................... | G01L 3/105 |
| | | | | | 73/862.336 |
| 5,412,999 A | * | 5/1995 | Vigmostad | ............. | G01D 5/485 |
| | | | | | 73/779 |

(Continued)

FOREIGN PATENT DOCUMENTS

| JP | 59-061730 A | 4/1984 |
| JP | 2001-050828 A | 2/2001 |

(Continued)

OTHER PUBLICATIONS

Decision to Grant issued from Japanese Patent Application 2021-562133 dated Nov. 16, 2021.

(Continued)

*Primary Examiner* — Max H Noori
(74) *Attorney, Agent, or Firm* — Sughrue Mion, PLLC (57) ABSTRACT

A torque measuring device includes: a magnetostrictive sensor having a ring-shaped holder arranged around a magnetostrictively affected section of a rotating shaft, a detecting section embedded in the holder and that changing a voltage according to a change in magnetic permeability of the magnetostrictively affected section; and a sensor-side engaging section; and a fixed member having a fixed-side engaging section, the fixed member not rotating even during operation. One of the sensor-side engaging portion and the fixed-side engaging section is a convex section and the other is a concave section. With the sensor-side engaging section and the fixed-side engaging section engaged with a concave-convex engagement, shifting of the position of the magnetostrictive sensor in the direction of rotation and the radial direction with respect to the substrate is prevented.

7 Claims, 4 Drawing Sheets

(56) References Cited

U.S. PATENT DOCUMENTS

| | | | | |
|---|---|---|---|---|
| 5,589,645 | A * | 12/1996 | Kobayashi | G01L 3/102 73/659 |
| 6,260,422 | B1 * | 7/2001 | Odachi | G01L 3/105 73/862.334 |
| 6,595,073 | B1 * | 7/2003 | Yagi | G01L 3/103 73/862.333 |
| 7,564,152 | B1 * | 7/2009 | Clark | H01F 1/147 148/108 |
| 10,119,942 | B2 * | 11/2018 | Owens | G01N 29/2493 |
| 10,367,434 | B2 * | 7/2019 | Ahmad | E21B 41/0085 |
| 2001/0029791 | A1 * | 10/2001 | Sezaki | G01L 5/221 73/862.333 |
| 2020/0232858 | A1 | 7/2020 | Kussmann et al. | |

FOREIGN PATENT DOCUMENTS

| | | |
|---|---|---|
| JP | 2011-145088 A | 7/2011 |
| JP | 2015-34754 A | 2/2015 |

OTHER PUBLICATIONS

International Search Report for PCT/JP2021/025004 dated Aug. 24, 2021 (PCT/ISA/210).

* cited by examiner

TORQUE MEASURING DEVICE

CROSS REFERENCE TO RELATED APPLICATIONS

This application is a National Stage of International Application No. PCT/JP2021/025004 filed Jul. 1, 2021, claiming priority based on Japanese Patent Application No. 2020-155208 filed Sep. 16, 2020.

TECHNICAL FIELD

The present invention relates to a torque measuring device that measures torque transmitted by a rotating shaft.

BACKGROUND ART

In recent years, in the field of automobiles, development of systems for measuring torque that is transmitted by a rotating shaft of a power train, or in other words, a power transmission mechanism, and then using the measurement results to execute output control of a drive source such as an engine or electric motor, or speed control of a transmission is advancing.

Conventionally, a magnetostriction-type torque measuring device has been known as a method for measuring torque that is transmitted by a rotating shaft. In a magnetostriction-type torque measuring device, as described in JP S59-61730A, magnetostrictive material is fixed to the outer-circumferential surface of a rotating shaft, and a magnetostrictive sensor that detects change in the magnetic permeability of the magnetostrictive material is arranged near the magnetostrictive material. When torque is applied to the rotating shaft and elastic torsional deformation occurs in the magnetostrictive material, a change in the magnetic permeability occurs in the magnetostrictive material due to a reverse magnetostriction effect. As a result, an output signal from the magnetostrictive sensor changes according to change in the magnetic permeability of the magnetostrictive material, and thus it is possible to measure torque that is transmitted by the rotating shaft.

CITATION LIST

Patent Literature

[Patent Literature 1] JP S59-61730A

SUMMARY OF INVENTION

Technical Problem

In a conventional magnetostrictive torque measuring device, in a case where the position of the magnetostrictive sensor that is arranged near the magnetostrictive material shifts in the direction of rotation and in the radial direction with respect to a fixed member that does not rotate even during operation, there is a possibility that an error will occur in the measured torque.

An object of the present invention is to provide a torque measuring device having a structure that is capable of preventing shifting of the position in the direction of rotation and the radial direction of the magnetostrictive sensor with respect to a fixed member that does not rotate even during operation.

Solution to Problem

The torque measuring device according to one aspect of the present invention includes a magnetostrictive sensor and a fixed member.

The magnetostrictive sensor has: a ring-shaped holder arranged around a magnetostrictively affected section of a rotating shaft, the magnetic permeability of which changes according to transmitted torque; a detecting section that is embedded in the holder and that changes a voltage according to the change in magnetic permeability of the magnetostrictively affected section; and a sensor-side engaging section.

The fixed member has a fixed-side engaging section and does not rotate even during operation.

One of the sensor-side engaging section and the fixed-side engaging section is a convex section that protrudes in the axial direction, and the other of the sensor-side engaging section and the fixed-side engaging section is a concave section that is recessed in the axial direction. With the sensor-side engaging section and the fixed-side engaging section engaged with a concave-convex engagement, shifting of the position in the direction of rotation and the radial direction of the magnetostrictive sensor with respect to the fixed member is prevented.

In the torque measuring device according to one aspect of the present invention, the magnetostrictive sensor includes a sensor-side connector having the sensor-side engaging section.

The fixed member is configured by a substrate that includes electronic circuits and a substrate-side connector having the fixed-side engaging section.

With the sensor-side connector and the substrate-side connector engaged, the detecting section and the electronic circuits are electrically connected.

Advantageous Effects of Invention

According to one aspect of the present invention, a torque measuring device having a structure that is capable of preventing shifting of the position in the direction of rotation and the radial direction of the magnetostrictive sensor with respect to a fixed member that does not rotate even during operation is provided.

DESCRIPTION OF THE EMBODIMENTS

First Example

A first example of an embodiment of the present invention will be described using FIG. 1 and FIG. 2.

The torque measuring device 1 of this example is a device that measures torque that is transmitted by a rotating shaft 2, and is used by being assembled in various kinds of mechanical devices. Specific examples of mechanical devices in which the torque measuring device 1 of this example may be incorporated include mechanical devices of an automobile power train such as transmissions that perform shifting by control on the vehicle side, for example, an automatic transmission (AT), a belt-type continuously variable transmission, a toroidal-type continuously variable transmission, an automated manual transmission (AMT), a dual clutch transmission (DCT), or a transfer, manual transmission (MT) and the like. Note that the method for driving the vehicle that is the object of this example is not particularly specified and may be FF, FR, MR, RR, 4WD or the like. Specific examples of mechanical devices in which the torque measuring device of this example is incorporated may further include a speed reducing or speed increasing gear of a wind turbine, a railroad car, a steel rolling mill, or the like.

The torque measuring device 1 of this example includes a magnetostrictive sensor 4, and a fixed member that does not rotate even during operation.

The magnetostrictive sensor 4 has: a ring-shaped holder 5 arranged around a magnetostrictively affected section of a rotating shaft 2, the magnetic permeability of which changes according to the transmitted torque; a detecting section that is embedded in the holder 5 and that changes the voltage according to the change in magnetic permeability of the magnetostrictively affected section; and a sensor-side engaging section.

The fixed member has a fixed-side engaging section and does not rotate even during operation.

One of the sensor-side engaging section and the fixed-side engaging section is a convex section that protrudes in the axial direction, and the other of the sensor-side engaging section and the fixed-side engaging section is a concave section that is recessed in the axial direction.

By engaging the sensor-side engaging section and the fixed-side engaging section with a concave-convex engagement, shifting of the position of the magnetostrictive sensor 4 in the direction of rotation and the radial direction with respect to the fixed member is prevented.

In the following, the rotating shaft 2 and the torque measuring device 1 that are the object of this example will be described in more detail. Unless stated otherwise, the axial direction of the torque measuring device 1 is the axial direction of the holder 5, or in other words, the left-right direction in FIG. 1 and FIG. 2. Moreover, one side in the axial direction is the right side in FIG. 1 and FIG. 2, and the other side in the axial direction is the left side in FIG. 1 and FIG. 2.

In this example, the rotating shaft 2 is rotatably supported by a rolling bearing (not illustrated) so as to be able to rotate with respect to a casing (not illustrated) that does not rotate even during operation, and has a magnetostrictively affected section, the magnetic permeability of which changes according to the torque that is transmitted.

Figure 1:
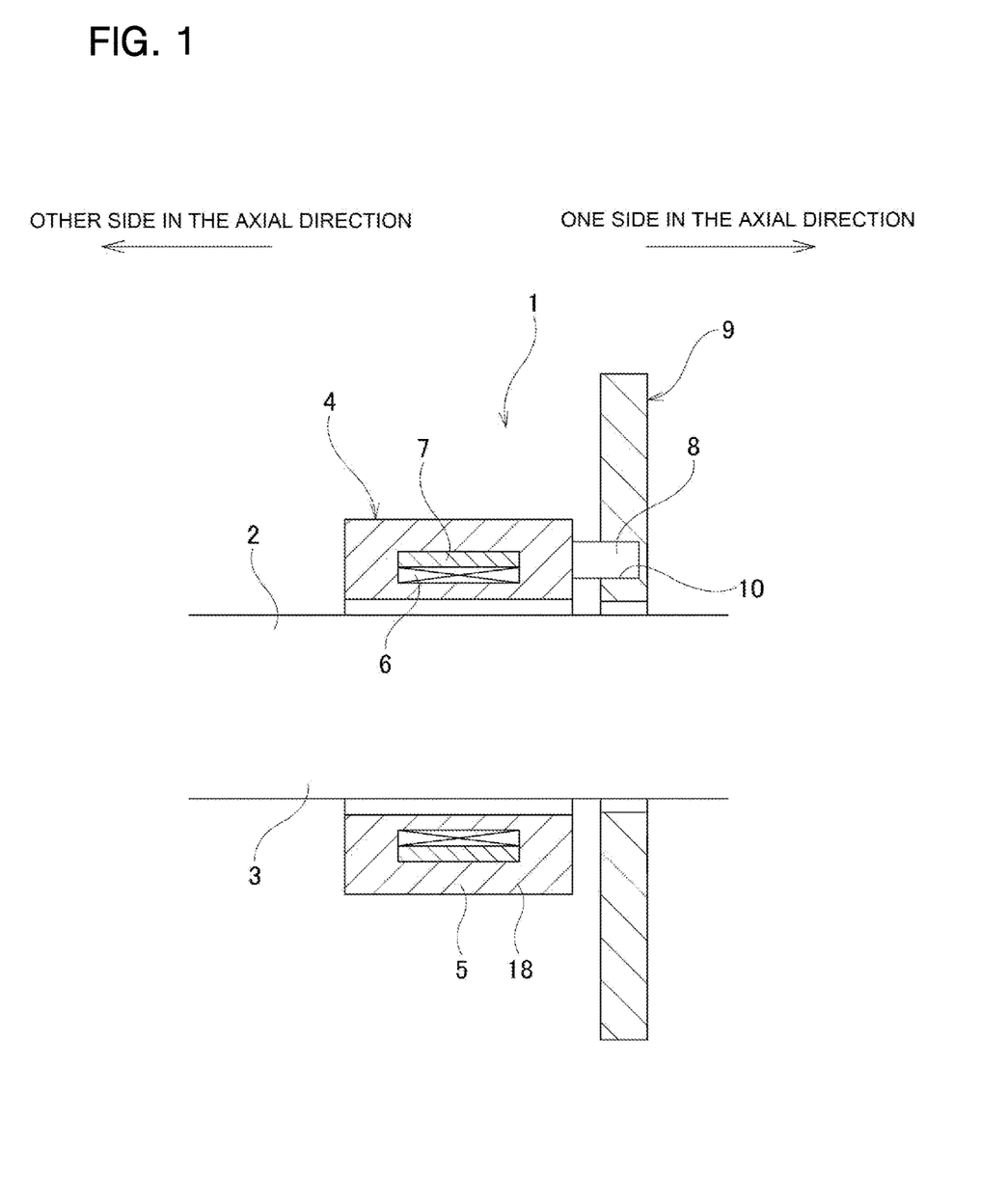
FIG. 1 is a cross-sectional view that schematically illustrates a torque measuring device of a first example of an embodiment of the present invention.
Figure 2:
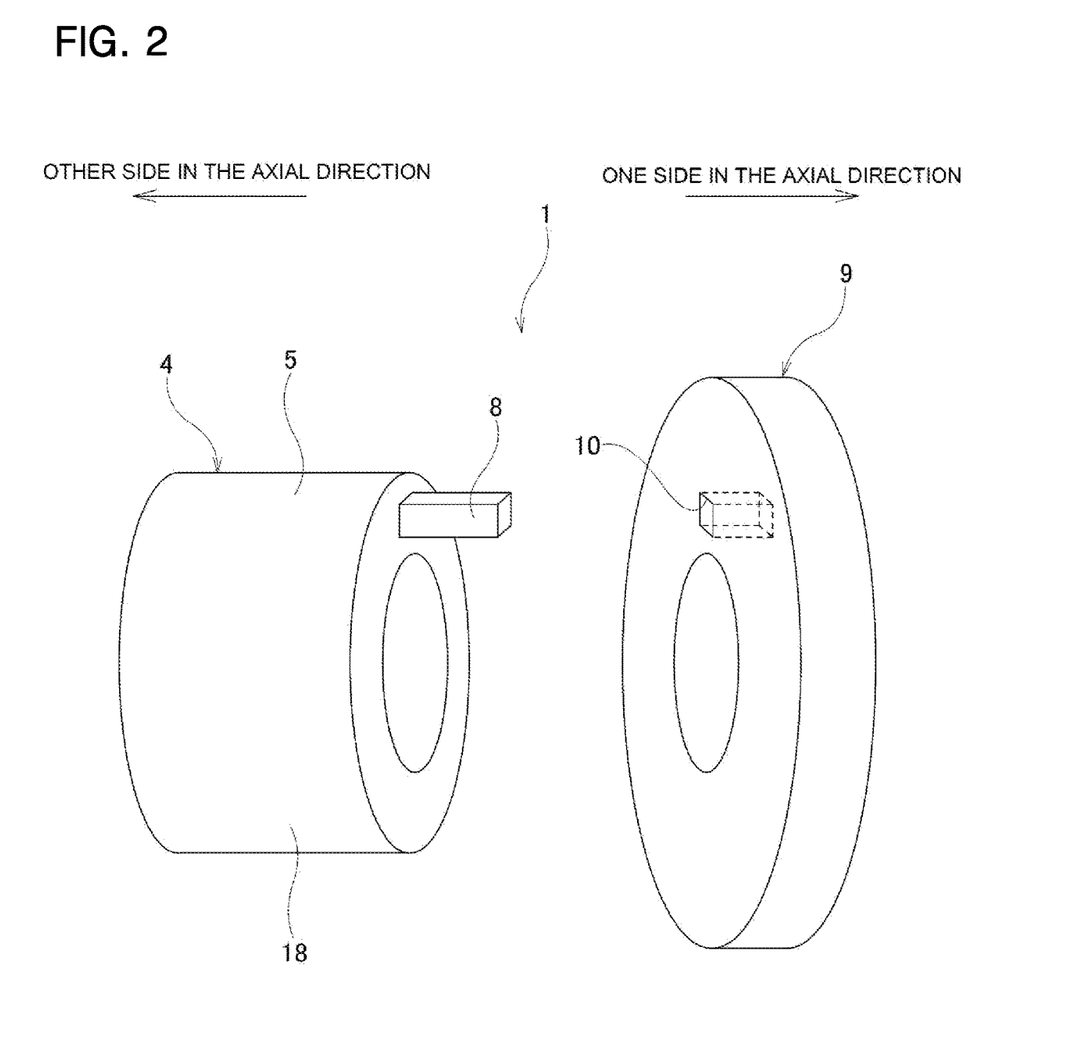
FIG. 2 is an exploded perspective view that schematically illustrates the torque measuring device of the first example.

The rotating shaft 2, as illustrated in FIG. 1, has an intermediate shaft section 3 in an intermediate section in the axial direction. The outer-circumferential surface of the intermediate shaft section 3 is a cylindrical surface. In this example, by making the rotating shaft 2 using a magnetic metal, the intermediate shaft section 3 of the rotating shaft 2 is made to function as a magnetostrictively affected section. As the magnetic metal of the rotating shaft 2, it is possible, for example, to use various kinds of magnetic steel such as carburized steel like SCr420, SCM420, or the like, or such as carbon steel like S45C.

When torque is applied to the rotating shaft 2 and torsional deformation occurs in the intermediate shaft section 3, stress that corresponds to the torque, or in other words, tensile stress in a +45° direction with respect to the axial direction, and compressive stress in a −45° direction with respect to the axial direction act on the intermediate shaft section 3. As this occurs, the magnetic permeability in each direction of the intermediate shaft section 3 changes due to a reverse magnetostriction effect.

In a case of implementing the present invention, it is possible to form a compression work hardened layer by performing a shot peening process in a portion of the outer-circumferential surface of the intermediate shaft section 3 that is made to face a coil 6 as the detecting section of the magnetostrictive sensor 4 so as to improve the mechanical properties and magnetic properties of that portion. In this way, it is possible to improve the sensitivity and hysteresis of the torque measurement by the magnetostrictive sensor 4.

In a case of implementing the present invention, instead of having the intermediate shaft section 3 itself function as the magnetostrictively affected section, it is possible to fix a magnetostrictive material that is separate from the intermediate shaft section 3 around the outer-circumferential surface of the intermediate shaft section 3 and to have that magnetostrictive material function as the magnetostrictively affected section. In this case, it is possible to externally fix a magnetostrictive material that is formed into a ring shape to the intermediate shaft section 3, or it is possible to fix a magnetostrictive material having a covering or film shape such as plating or the like to the outer-circumferential surface of the intermediate shaft section 3.

The torque measuring device 1 of this example includes a magnetostrictive sensor 4, and a substrate 9 having the fixed member that does not rotate even during operation.

The magnetostrictive sensor 4 includes a holder 5, a coil 6 as a detecting section, and a back yoke 7.

The holder 5 has a cylindrical shape and is made using a synthetic resin. The holder 5 includes a main holder body 18 arranged around the intermediate shaft section 3 of the rotating shaft 2, and a convex section 8 that constitutes the sensor-side engaging section and that protrudes from one location in the circumferential direction on a side surface on one side in the axial direction of the main holder body 18 toward the one side in the axial direction. In this example, the convex section 8 includes a tip-end section that is the end section on the one side in the axial direction of a bar-shaped part, the base-end section of which is the end section on the other side in the axial direction and embedded in the main holder body 18. However, in a case of implementing the present invention, the convex section may also be made of the synthetic resin of the holder and be integrated as a single body with the cylindrical shaped main holder body. In this example, the convex section 8 has a rectangular end surface shape as viewed in the axial direction.

The coil 6 is formed entirely into a cylindrical shape. The coil 6 is embedded in the holder 5 and is coaxially arranged with the holder 5. During operation, by applying an alternating-current voltage to the coil 6, an alternating-current magnetic field is generated around the coil 6.

The back yoke 7 is a member that serves as a magnetic path for a magnetic flux generated by the coil 6, and is formed entirely into a cylindrical shape using a magnetic material such as mild steel or the like. The back yoke 7 is embedded in the holder 5 and is arranged so as to externally fit around the coil 6.

In this example, the substrate 9 is formed entirely into a hollow circular disk shape. The substrate 9 is arranged at a position adjacent to the one side in the axial direction of the magnetostrictive sensor 4 and is coaxial with the holder 5 of the magnetostrictive sensor 4. Moreover, in this state, the substrate 9 is arranged around the intermediate shaft section 3 of the rotating shaft 2, and is supported by and fixed to the casing by screws or the like. The substrate 9 includes electronic circuits (not illustrated) and a concave section 10. In a case of implementing the present invention, the shape of the substrate is not limited to a hollow disk shape such as in this example, and it is also possible to adopt various shapes such as a solid disk shape, a rectangular plate shape, and the like. However, whatever shape is adopted, the substrate is arranged such that there is no interference with the rotating shaft.

In this example, the electronic circuits include a torque detecting circuit that uses the voltage of the coil 6 to calculate the torque transmitted by the rotating shaft 2.

A concave section 10 is provided at a location of the substrate 9 that is aligned in the axial direction with the convex section 8, and is open on the other side in the axial direction. In other words, the concave section 10 is formed so as to be recessed toward the one side in the axial direction. Moreover, in this example, the concave section 10 has a rectangular opening shape as viewed in the axial direction.

In this example, by inserting the convex section 8 of the holder 5 into the concave section 10 of the substrate 9, the convex section 8 and the concave section 10 engage with a concave-convex engagement. As a result, the magnetostrictive sensor 4 is supported in a state in which shifting of the position with respect to the substrate 9 in the direction of rotation and the radial direction is prevented. In other words, in this example, the convex section 8 constitutes a sensor-side engaging section and the concave section 10 constitutes the fixed-side engaging section.

In this example, the convex section 8 has a rectangular end surface shape, and the concave section 10 has a rectangular opening shape. In other words, the convex section 8 and the concave section 10 fit together with a non-circular fit. As a result, the magnetostrictive sensor 4 and the substrate 9 are prevented from relative rotation about the engagement portion between the convex section 8 and the concave section 10.

In a case of implementing the present invention, the end surface shape of the convex section and the opening shape of the concave section are not limited to being rectangular, and could be various non-circular shapes such as an elliptical shape or the like. Moreover, the end surface shape of the convex section and the opening shape of the concave section could also be circular.

Moreover, in a case of implementing the present invention, the sensor-side engaging section could be a concave section that is recessed in the axial direction, and the fixed-side engaging section could be a convex section that protrudes in the axial direction.

The coil 6 and electronic circuits of the substrate 9 are electrically connected using wiring, and conductor or the like (not illustrated) that have flexibility.

By applying torque to the rotating shaft 2, torsional deformation occurs in the intermediate shaft section 3, and when the magnetic permeability changes in each direction of the intermediate shaft section 3, the magnetic flux flowing inside the coil 6 of the magnetostrictive sensor 4 changes, and as a result the voltage of the coil 6 changes due to change in the inductance of the coil 6. Therefore, it is possible to measure the torque that is transmitted by the rotating shaft 2 by using the voltage of the coil 6. In this example, the electronic circuits of the substrate 9 use the voltage of the coil 6 to calculate the torque transmitted by the rotating shaft 2.

In a case of implementing the present invention, instead of a coil, it is also possible to use a magnet detecting element such as a Hall element or the like as the detecting section of the magnetostrictive sensor.

In this example, by just engaging the convex section 8 and the concave section 10 with a concave-convex engagement by inserting the convex section 8 of the magnetostrictive sensor 4 into the concave section 10 of the substrate 9, it is possible to support the magnetostrictive sensor 4 in a state in which shifting of the position in the direction of rotation and the radial direction with respect to the substrate 9 is prevented. In other words, with this example, a structure in which shifting of the position in the direction of rotation and the radial direction of the magnetostrictive sensor 4 with respect to the substrate 9 is prevented can be achieved by a simple configuration of just engaging the convex section 8 and the concave section 10 with a concave-convex engagement.

In this example, by fitting the convex section 8 and the concave section 10 together with a non-circular fit, the magnetostrictive sensor 4 and the substrate 9 are prevented from relative rotation about the connecting section between the convex section 8 and the concave section 10. As a result, a suitable positional relation between the intermediate shaft section 3 and the magnetostrictive sensor 4 is maintained, and thus the precision of the torque measurement is also maintained.

In this example, not only a configuration of preventing shifting of the position in the direction of rotation and the radial direction of the magnetostrictive sensor 4 with respect to the substrate 9 by engaging the convex section 8 of the holder 5 and the concave section 10 of the substrate 9 with a concave-convex engagement, but also a configuration of supporting the magnetostrictive sensor 4 with respect to the substrate 9 is adopted. However, in a case of implementing the present invention, shifting of the position in the direction of rotation and the radial direction of the magnetostrictive sensor 4 with respect to the substrate 9 by engaging the convex section 8 of the holder 5 with the concave section 10 of the substrate 9 with a concave-convex engagement is prevented, however, it is also possible to adopt a configuration of supporting the magnetostrictive sensor 4 with a fixed portion such as the substrate 9, casing or the like that does not rotate even during operation by some other method screws, fitting or the like. For example, it is also possible to adopt a configuration of supporting the magnetostrictive sensor 4 with respect to the casing by internally fitting the main holder body 18 with the inner-circumferential surface of the casing. In this case, it is possible to prevent shifting of the position in the direction of rotation and radial direction of the magnetostrictive sensor 4 by a concave-convex engagement between the convex section 8 and the concave section 10, and thus it is not necessary to prevent shifting of the position in the direction of rotation and the radial direction of the magnetostrictive sensor 4 by a fitting section between the main holder body 18 and the inner-circumferential surface of the casing. Therefore, it is not necessary to increase the shape precision of the inner-circumferential surface of the casing to an extent that it is possible to perform a fit with strength capable of preventing shifting of the position in the direction of rotation and the radial direction of the magnetostrictive sensor 4, and thus it is possible to reduce the manufacturing cost of the torque measuring device 1.

Second Example

Figure 3:
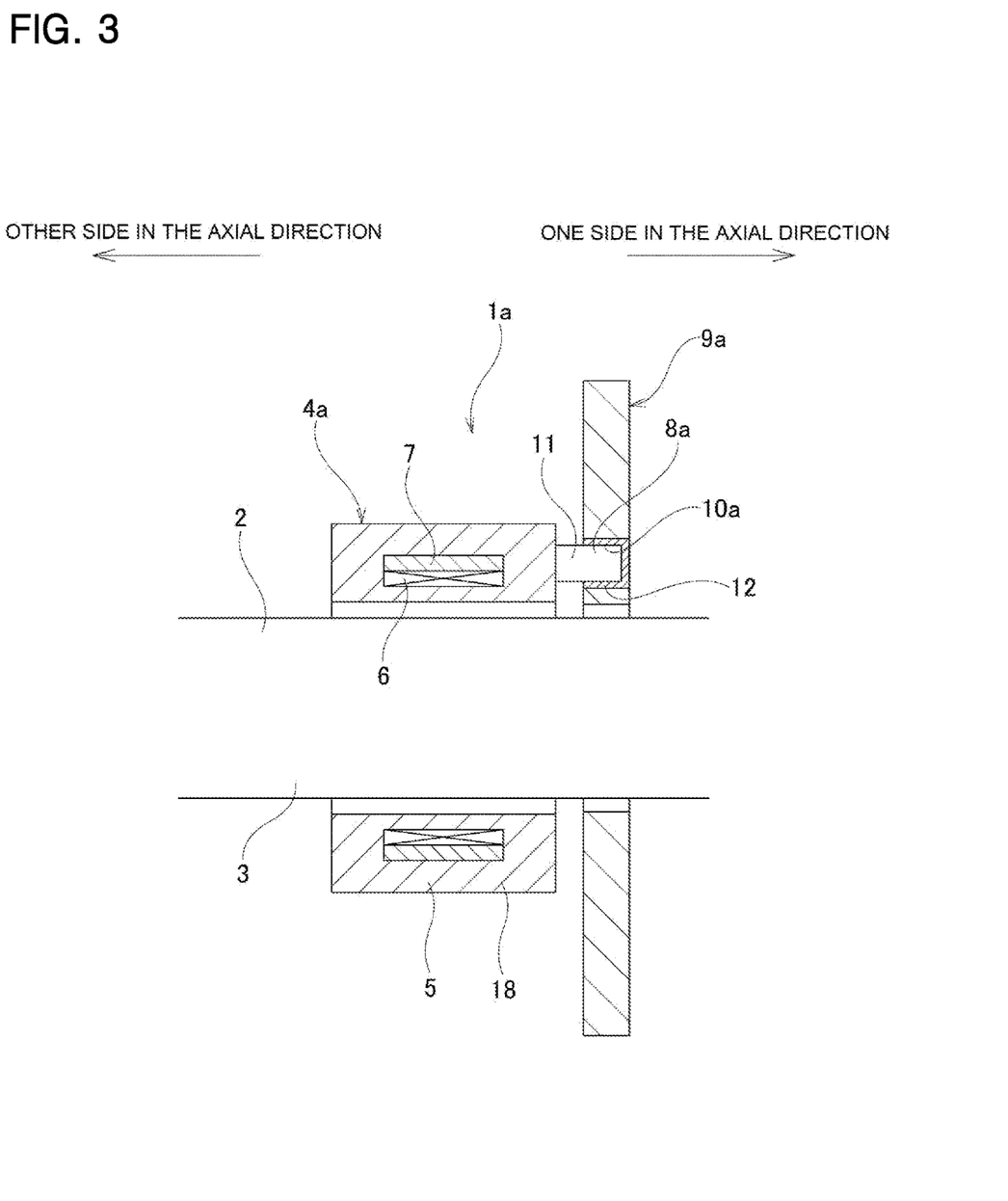
FIG. 3 is a cross-sectional view that schematically illustrates a torque measuring device of a second example of an embodiment of the present invention.
Figure 4:
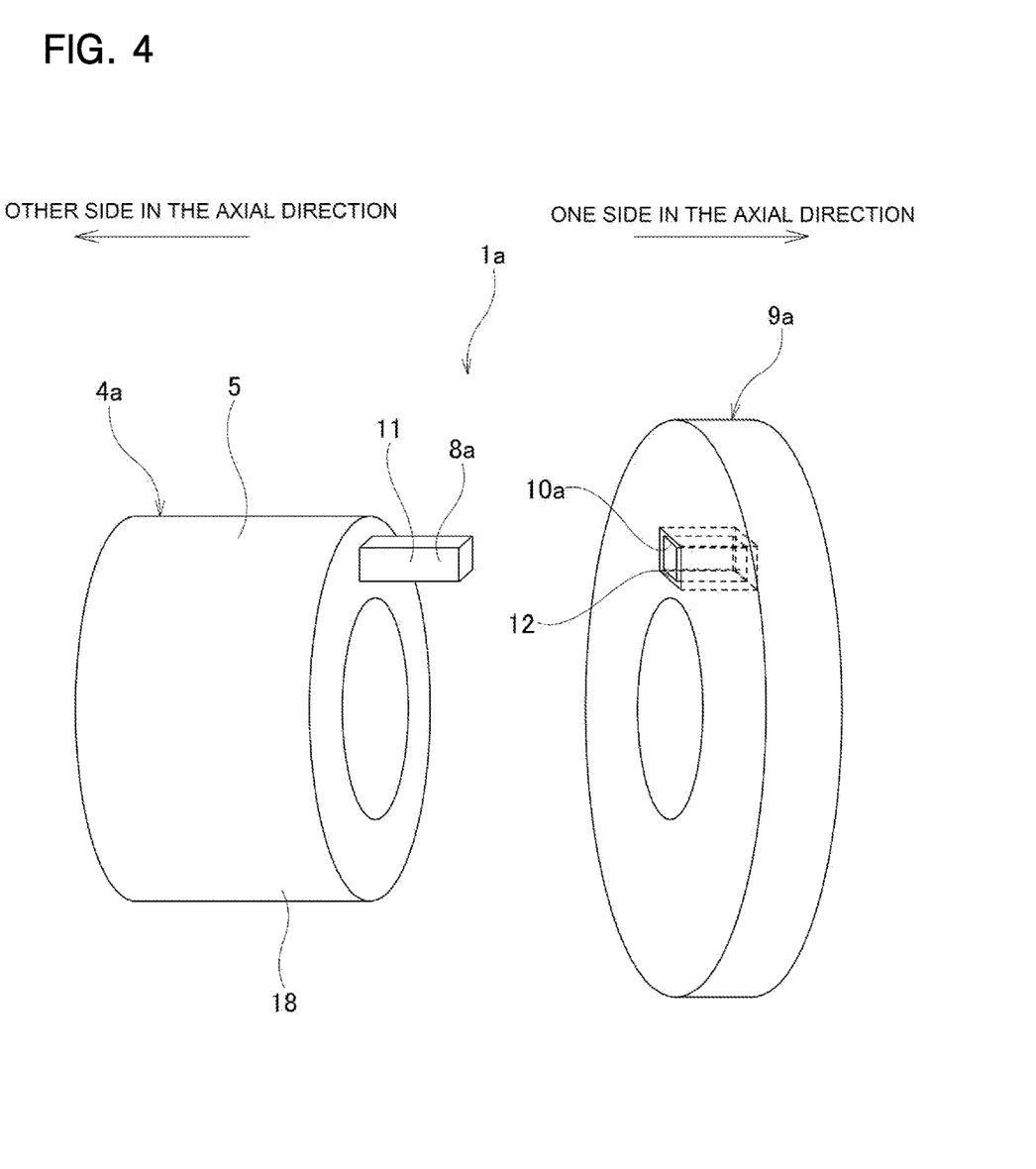
FIG. 4 is an exploded perspective view that schematically illustrates the torque measuring device of the second example.

A second example of an embodiment of the present invention will be described using FIG. 3 and FIG. 4.

In the torque measuring device 1a of this example, a magnetostrictive sensor 4a includes a sensor-side connector 11. The sensor-side connector 11 is a male connector, and has a convex section 8a that protrudes from one location in the circumferential direction of a side surface on one side in the axial direction of the main holder body 18 of the holder 5 toward the one side in the axial direction. The convex section 8a has a rectangular end surface shape as viewed in the axial direction. The sensor-side connector 11 electrically conducts to the coil 6 via wiring (not illustrated).

In this example, a substrate 9a, which is a fixed member, includes a substrate-side connector 12. The substrate-side connector 12 is a female connector and has a concave section 10a that is provided at a location of the substrate 9 that is aligned in the axial direction with the sensor-side connector 11 and recessed toward the one side in the axial direction. In this example, the concave section 10a has a rectangular opening shape. The substrate-side connector 12 electrically conducts to the electronic circuits of the substrate 9a. Note that in the illustrated example, the substrate-side connector 12 does not protrude toward the other side in the axial direction more than portions of the substrate 9a located around the substrate-side connector 12; however, in a case of implementing the present invention, it is possible for the substrate-side connector to protrude toward the other side in the axial direction more than portions of the substrate located around the substrate-side connector.

In this example, by engaging the convex section 8a and the concave section 10a with a concave-convex engagement by inserting the convex section 8a of the sensor-side connector 11 into the concave section 10a of the substrate-side connector 12, the sensor-side connector 11 and the substrate-side connector 12 are engaged, or in other words, connected. As a result, the magnetostrictive sensor 4 is supported in a state in which shifting of the position in the direction of rotation and the radial direction with respect to the substrate 9a is prevented, and the coil 6 and the electronic circuits of the substrate 9a are electrically connected.

With this example, a structure in which the magnetostrictive sensor 4 is supported in a state in which shifting of the position in the direction of rotation and the radial direction with respect to the substrate 9a is prevented, and the coil 6 and the substrate 9a are electrically connected can be achieved by a simple structure of just connecting the sensor-side connector 11 and the substrate-side connector 12.

In this example, the end surface shape of the convex section 8a of the sensor-side connector 11 and the opening shape of the concave section 10a of the substrate-side connector 12 are a non-circular rectangular shape, and thus in a state in which the sensor-side connector 11 and the substrate-side connector 12 are connected, it is possible to prevent relative rotation of the magnetostrictive sensor 4a and the substrate 9a about the connecting section between the sensor-side connector 11 and the substrate-side connector 12.

In a case of implementing the present invention, the end surface shape of the convex section of the sensor-side connector and the opening shape of the concave section of the substrate-side connector are not limited to a rectangular shape, and various non-circular shapes are possible such as a polygonal shape other than a rectangular shape, an elliptical shape, and the like. Moreover, the end surface shape of the convex section of the sensor-side connector and the opening shape of the concave section of the substrate-side connector could also be a circular shape.

In a case of implementing the present invention, the sensor-side connector could be a female connector, and the substrate-side connector could be a male connector.

In the structure of this example, by connecting the sensor-side connector 11 and the substrate-side connector 12, not only is it possible to prevent shifting of the position in the direction of rotation and the radial direction of the magnetostrictive sensor 4 with respect to the substrate 9a, it is also possible to electrically connect the coil 6 and the electronic circuits of the substrate 9a. Therefore, it is not necessary to separately install wiring or the like for electrically connecting the coil 6 and the electronic circuits of the substrate 9a. Accordingly, it is possible to reduce the number of parts of the torque measuring device 1a by that amount. As a result, it is possible to suppress the manufacturing cost of the torque measuring device 1a.

The other construction and operational effects of the second example are the same as in the first example.

The structures of the embodiments described above can be appropriately combined and implemented as long as there is no contradiction.

REFERENCE SIGNS LIST 1, 1a Torque measuring device
2 Rotating shaft
3 Intermediate shaft section
4, 4a Magnetostrictive sensor
5 Holder
6 Coil
7 Back yoke
8, 8a Convex section
9, 9a Substrate
10, 10a Concave section
11 Sensor-side connector
12 Substrate-side connector
18 Main holder body

The invention claimed is:

1. A torque measuring device, comprising:
a magnetostrictive sensor having: a ring-shaped holder arranged around a magnetostrictively affected section of a rotating shaft, magnetic permeability of which changes according to transmitted torque; a detecting section that is embedded in the holder and that changes a voltage according to the change in magnetic permeability of the magnetostrictively affected section; and a sensor-side engaging section; and
a fixed member that has a fixed-side engaging section and does not rotate even during operation;
one of a sensor-side engaging section and a fixed-side engaging section having a convex section that protrudes in an axial direction, and the other of the sensor-side engaging section and the fixed-side engaging section having a concave section that is recessed in the axial direction; and
with the sensor-side engaging section and the fixed-side engaging section engaged with a concave-convex engagement, shifting of a position of the magnetostrictive sensor in a direction of rotation and a radial direction with respect to the fixed member being prevented.

2. The torque measuring device according to claim 1, wherein
the magnetostrictive sensor comprises a sensor-side connector having the sensor-side engaging section;

the fixed member comprises a substrate that includes electronic circuits and a substrate-side connector having the fixed-side engaging section; and with the sensor-side connector and the substrate-side connector engaged, the detecting section and the electronic circuits are electrically connected.

3. The torque measuring device according to claim 1, wherein the convex section and the concave section are fitted together with a non-circular fit.

4. The torque measuring device according to claim 1, wherein with the sensor-side engaging section and the fixed-side engaging section engaged with the concave-convex engagement, the magnetostrictive sensor is supported with respect to the fixed member.

5. The torque measuring device according to claim 1, wherein the magnetostrictive sensor is supported with respect to the fixed member by a different means than the concave-convex engagement of the sensor-side engaging section and the fixed-side engaging section.

6. The torque measuring device according to claim 1, wherein the sensor-side engaging section is configured by the convex section, and the fixed-side engaging section is configured by the concave section; and the concave section comprises a tip-end section of a bar-shaped part that is embedded in the holder.

7. The torque measuring device according to claim 1, wherein the sensor-side engaging section is configured by the convex section, and the fixed-side engaging section is configured by the concave section; and the convex section is integrally formed as a single body with the holder made of a synthetic resin.

* * * * *